No. 849,702. PATENTED APR. 9, 1907.
C. A. SEVIER.
GUARD AND MOISTENER FOR DENTAL TOOLS.
APPLICATION FILED JULY 12, 1906.
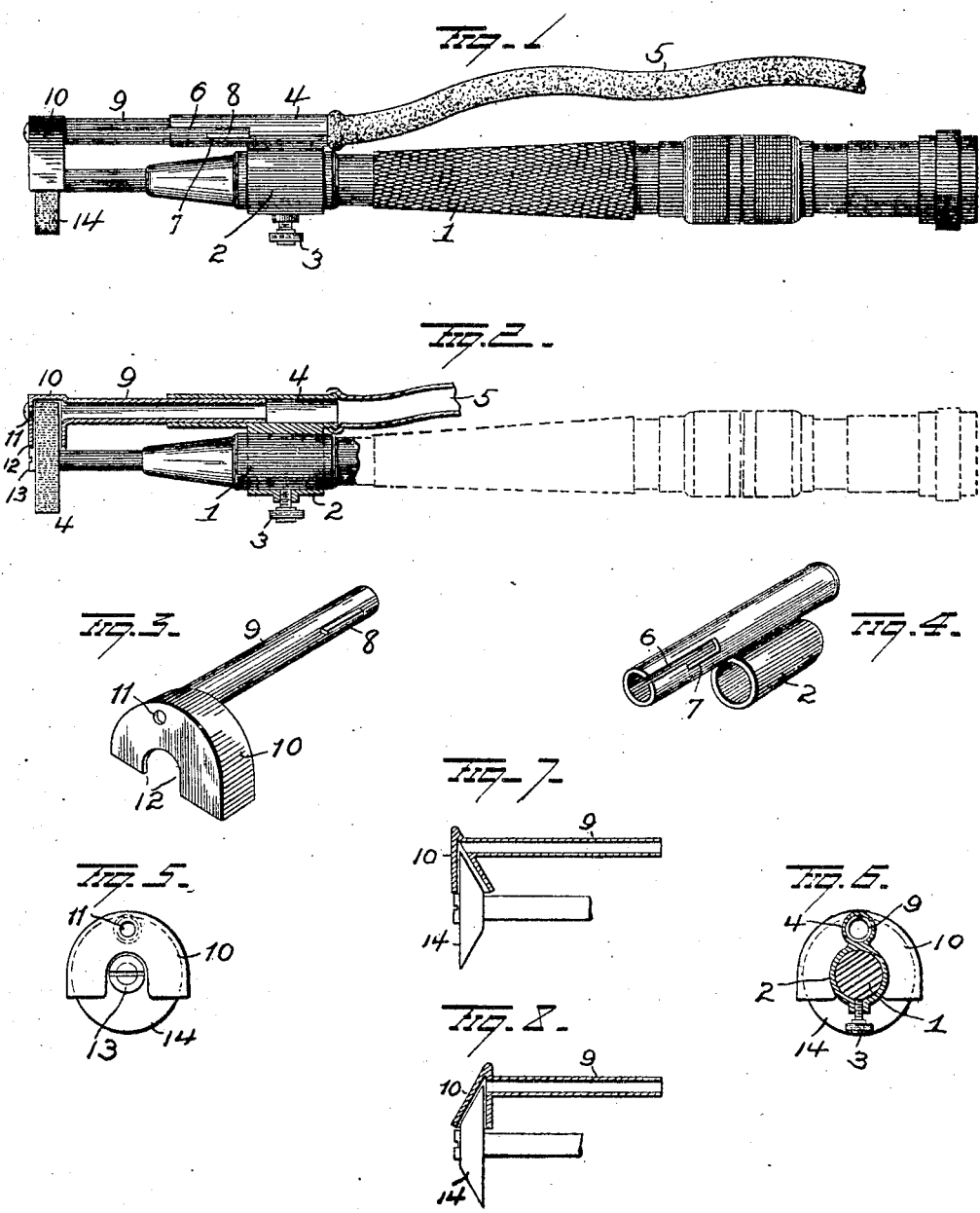
WITNESSES
INVENTOR
Attorney

UNITED STATES PATENT OFFICE.

CHARLES ANDERSON SEVIER, OF JACKSON, TENNESSEE.

GUARD AND MOISTENER FOR DENTAL TOOLS.

No. 849,702.　　　　Specification of Letters Patent.　　　　Patented April 9, 1907.

Application filed July 12, 1906. Serial No. 325,918.

*To all whom it may concern:*

Be it known that I, CHARLES ANDERSON SEVIER, a resident of Jackson, in the county of Madison and State of Tennessee, have invented certain new and useful Improvements in Guards and Moisteners for Dental Tools; and I do hereby declare the following to be a full, clear, and exact description of the invention, such as will enable others skilled in the art to which it appertains to make and use the same.

My invention relates to improvements in guards and moisteners for dental tools, the object of the invention being to provide improvements of this character which can be easily and quickly attached to the nozzle or handhold of a dental engine and which is capable of adjustment and interchange of parts to enable its use on various shapes and sizes of grindstones.

With these and other objects in view the invention consists in certain novel features of construction and combinations and arrangements of parts, as will be more fully hereinafter described, and pointed out in the claims.

In the accompanying drawings, Figure 1 is a view in elevation illustrating my improvements. Fig. 2 is a view in longitudinal section. Figs. 3, 4, 5, and 6 are views of details, and 7 and 8 are views of slight modifications.

1 represents the nozzle or handhold of a dental engine, to which my improvements are connected, as will now be explained.

2 represents a collar or band to be slipped onto the nozzle or handhold 1 and secured in place by a thumb-screw 3. To this collar or band 2 a tube 4 is secured and is adapted to be connected by a hose 5 with any source of water-supply. This tube 4 is made with a longitudinal slot 6, having a notch or offset 7 to receive a lug or key 8 on a tube 9, telescoping in tube 4 and locked in position by means of the lug or key 8. It is of course to be understood that the slot may be in either tube to receive the lug or key in the other tube, and I do not limit myself in this particular.

The free end of tube 9 carries a semicircular or semicylindrical shield 10 for a grindstone, and the tube 9 communicates with the interior of the shield, and the latter has an opening 11 in its outer wall opposite tube 9 to permit the insertion of a wire or rod into the tube to clean the same. The opening 11 may be closed by a screw-plug or other device to normally close the opening 11, but permit ready access to the tube when desired.

The shield 10 is notched at its central portion, as shown at 12, to permit ready access to the screw 13, holding the grindstone 14 in position and permit the removal or adjustment of the screw and removal and replacement of the grindstone without detaching the shield.

The shield 10 may be made either of the general semicircular or semicylindrical shape shown in Fig. 1 or of other shapes to conform to the shape of the grindstone. In Figs. 7 and 8 I have illustrated semiconical shapes of shield to receive conical grindstones, and these shields may have beveled outer or inner walls or other contour to conform to the outline of the stone.

A great many other slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a nozzle or handhold of a dental engine, of a collar or band to be inserted on the nozzle, a thumb-screw securing the collar to the nozzle, a tube secured to the collar, a second tube having telescopic connection with the first-mentioned tube, and a grindstone-shield on the last-mentioned tube.

2. The combination with a nozzle or handhold for dental engines, of a collar or band to be inserted on the nozzle, a thumb-screw securing the collar to the nozzle, a tube secured to the collar, a second tube having telescopic connection with the first-mentioned tube, a lug or key on one of said tubes movable in a slot and notch or offset in the other to lock the tubes together, and a grindstone-shield on the free end of the last-mentioned tube.

3. An attachment for dental grindstones, comprising a tube composed of telescopic sections, a collar secured to one section and adapted to be inserted on a dental-engine nozzle or handhold, a set-screw in the collar to secure the same onto the nozzle, a grindstone-shield on the free or outer end of the tube, and means for supplying moisture to the tube and shield.

4. An attachment for dental grindstones, comprising a tube composed of separable sections, means on one section to attach the tube to a dental-engine nozzle or handhold, a grindstone-shield on the end of the tube having an opening in its wall opposite the tube, and also having a notched central portion.

In testimony whereof I have signed this specification in the presence of two subscribing witnesses.

CHARLES ANDERSON SEVIER.

Witnesses:
J. W. VANDEN,
F. I. TAYLOR.